Sept. 12, 1950     M. B. STALLARD     2,522,068
TRANSPORT FOR POWER UNITS
Filed Sept. 19, 1947     3 Sheets-Sheet 1
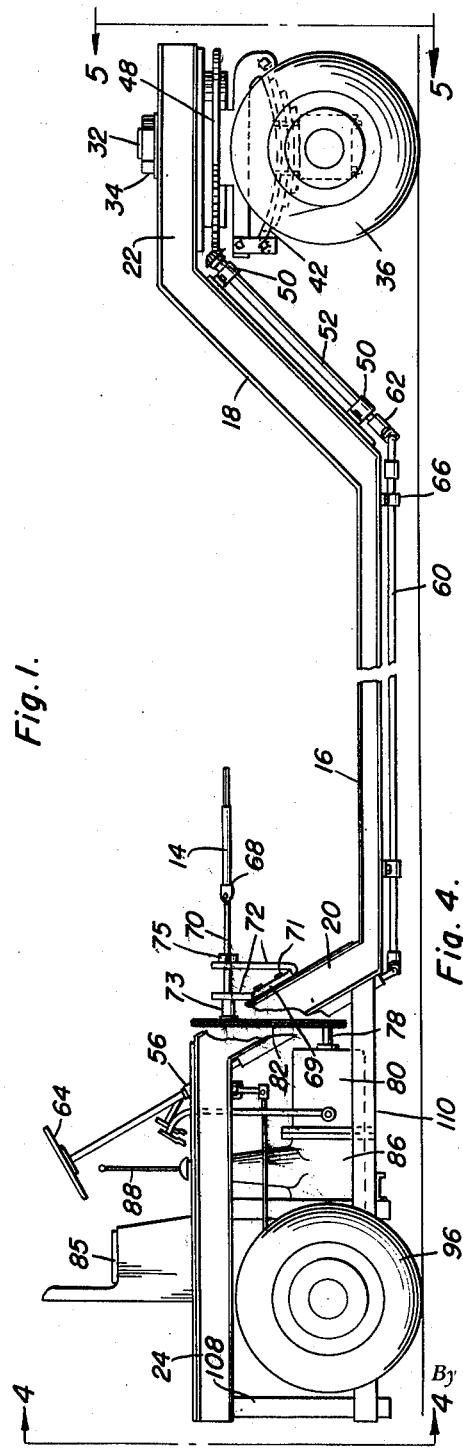
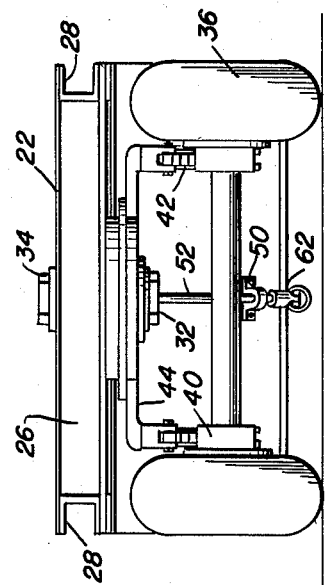
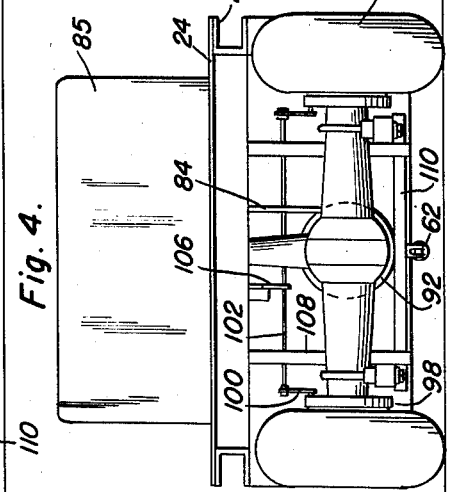
Inventor
Melvin Berl Stallard

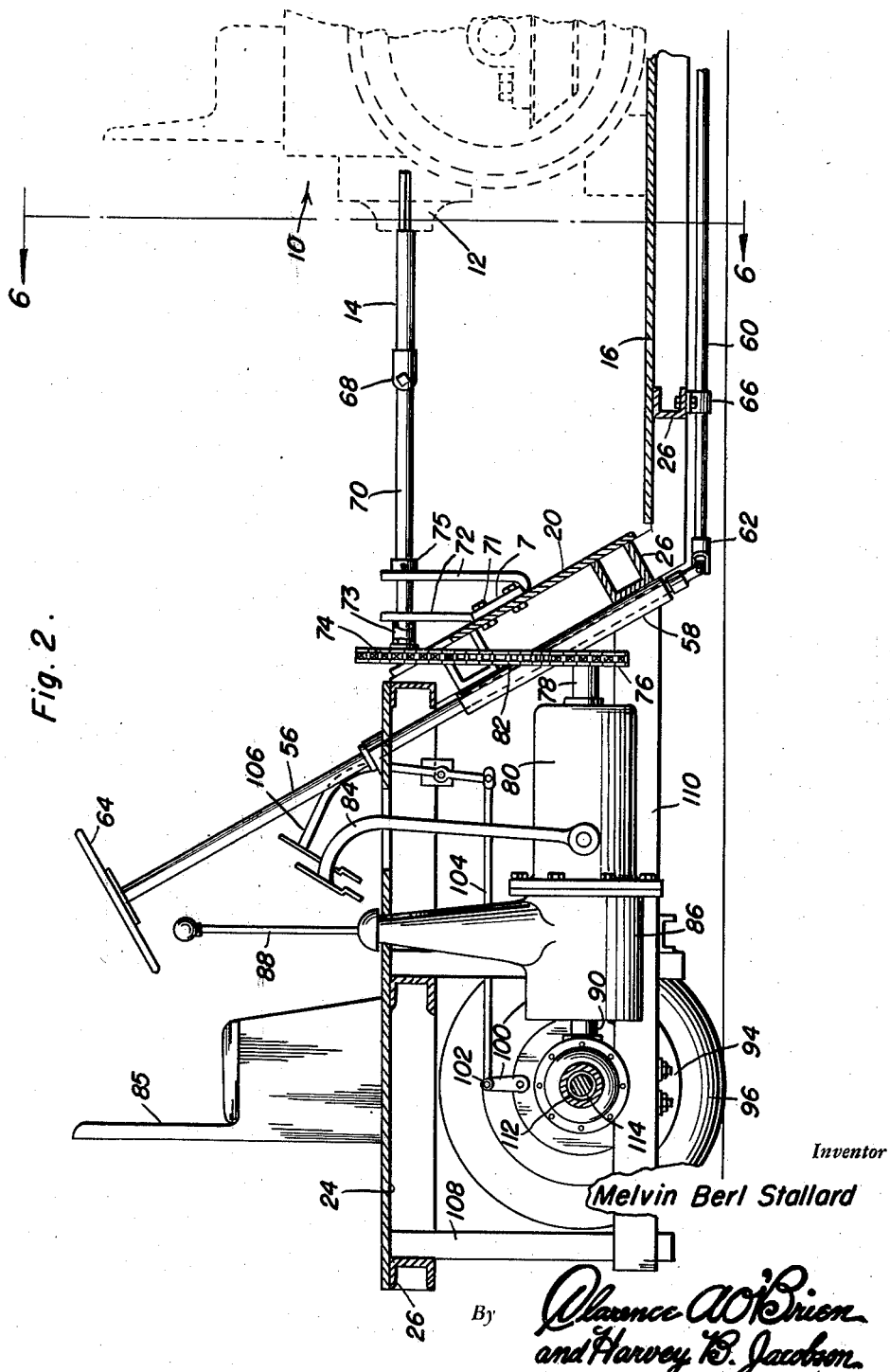

Sept. 12, 1950 M. B. STALLARD 2,522,068
TRANSPORT FOR POWER UNITS
Filed Sept. 19, 1947 3 Sheets-Sheet 3

Inventor
Melvin Berl Stallard

By Clarence A. O'Brien
and Harvey B. Jacobson
Attorneys

Patented Sept. 12, 1950

2,522,068

UNITED STATES PATENT OFFICE 2,522,068

TRANSPORT FOR POWER UNITS

Melvin Berl Stallard, Miles City, Mont., assignor of fifty per cent to Fred R. Hardesty, Miles City, Mont.

Application September 19, 1947, Serial No. 775,039

2 Claims. (Cl. 180—1)

This invention relates generally to transports, and more particularly to a transport for power units such as engines and tractors having a power take-off, whereby said engine or tractor may be transported using the power of the engine or tractor to propel the transport.

A primary object of this invention is to provide a device comprising a frame with ground-contacting, steering and traction wheels, and a low swung bed with goosenecks adjacent each end, whereon an engine or tractor or the like may be carried, the engine or tractor being connected through the necessary complement of a power transmission mechanism with the traction wheels.

Another salient object of this invention is to provide a transport of this character with a low-swung bed with gooseneck portions adjacent each end thereof, and the steering wheels and power transmission means and traction wheels being mounted on the frame of the transport almost entirely beneath the ends of the frame beyond the said gooseneck portions, and the said steering wheels being controlled by steering columns mounted on said goosenecks, together with a turntable associated with the steering wheels, so that the bed of the frame is not encumbered.

Still another object of this invention is to provide, in combination with the power transmission mechanism, a gear shift lever, clutch pedal and brake control pedal, all operatively connected with corresponding units in the power transmission mechanism, whereby the transport may be controlled without the absolute necessity of changing the throttle adjustment of the engine or tractor being transported.

Still another object of this invention is to provide a device of this character which is simplified in construction and adapted for use with various types of engines, tractors, and the like.

And a last object to be specifically mentioned is to provide a device of this character which is relatively inexpensive and practicable to manufacture, extremely simple and convenient to use, and which will give generally efficient and durable service.

With these objects definitely in view, this invention resides in certain novel features of construction, combination and arrangement of parts and portions as will be hereinafter described in detail in the specification, particularly pointed out in the appended claims, and illustrated in the accompanying drawings which form a material part of this application, and in which:

Figure 1 is a side elevational view of the assembled transport;

Figure 2 is a longitudinal vertical sectional view of the rear portion of the transport, the majority of the parts being shown in elevation, and the figure including the representation of the rear end of a tractor mounted on the transport;

Figure 4 is a rear end elevational view of the transport;

Figure 5 is a front elevational view of the transport, as viewed from the right-hand side of Figure 3.

Similar characters of reference designate similar or identical parts and portions throughout the specification and throughout the several views of the drawings.

Figure 3:
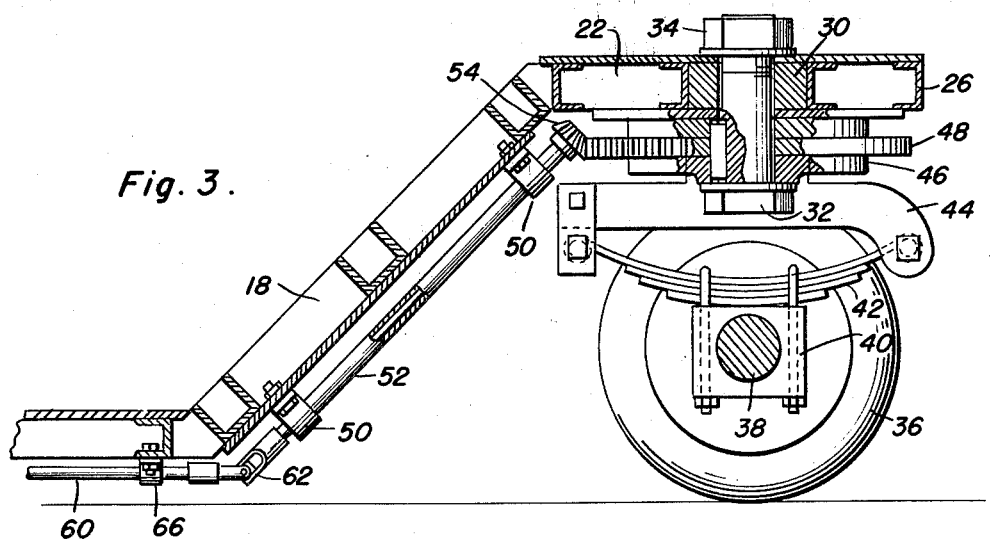
Figure 3 is a longitudinal vertical sectional view of the forward end of the transport.

Referring now to the drawings in detail, the environment wherewith this invention is adapted to be used includes a tractor generally indicated by the numeral 10 and having a power take-off 12, or an engine. Of course, the tractor may be of wheeled or caterpillar type, the engine may be of any one of a wide variety of types, and the essential characteristic of the device to be transported is the provision thereon of a power take-off which may be connected to the power transmission means of the transport. It will be understood that the power unit to be transported may be lifted and disposed on the transport as required to bring the power take-off unit of the device into proper operative registration with the power take-off adapter shaft 14 indicated in Figures 1 and 2.

Figure 6:
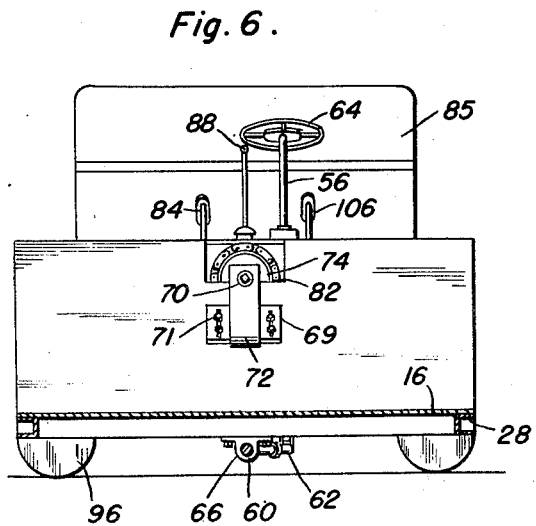
Figure 6 is a vertical transverse sectional view of the transport, taken on the line 6—6 in Figure 2 and in the direction of the arrows, the majority of the parts being illustrated in elevation.

The frame of the transport includes a low-swung bed 16 secured at the forward and rear ends thereof to gooseneck portions 18 and 20 which terminate at their outer ends in horizontal portions hereinafter referred to as the front end 22 and the rear end 24. It will be noted that the preferred construction of this frame includes the provision of a plurality of tranversely disposed channel members 26 which are rigidly secured, as by welding, to the horizontal plate portions of the frame. It will be understood that the bed 16, as well as the other portions of the frame, includes a plate structure of considerable thickness and strength and that the frame will be reinforced with longitudinally disposed channel members 28, as indicated best in Figures 4, 5 and 6.

The front end 22 of the frame includes a transversely disposed cross member 30 which functions as a bearing for an axis member 32, indicated in the drawings as of bolt character. This axis member is threaded at the upper end and provided with a large nut 34, but it should be understood that the representation in the drawings is intended as illustrative only of any suitable anti-friction axis member and bearing assembly whereby the front wheels 36 may be pivotally mounted on the front end 22 of the frame. The wheels 36 are carried on an axle 38 which is shackled, as at 40, to suspension springs 42, preferably of leaf character, and terminally secured, according to conventional practice, on a suitable framework 44 carried by the turntable 46. As indicated above, the turntable 46 is pivotally mounted by means of the axis member 32 and this turntable is provided with a ring gear 48 rigidly secured thereto.

The forward gooseneck 18 is provided with thrust bearings 50 in which is mounted an inclined steering column 52 having, at its upper end, a bevel gear 54 in continuous engagement with the ring gear 48. A somewhat similar steering column 56 is carried in a sleeve bearing 58 on the under side of the rear gooseneck 20, and a horizontal shaft 60 is used to link the lower ends of the steering columns 52 and 56 together, by means of universal joints 62. The upper end of the rear steering column 58 is provided with a steering wheel 64, and it will be understood that a suitable complement of bearings, such as those indicated at 66, will be provided to properly support the horizontal shaft 60. The foregoing structure enables the directional control of the transport without encumbering the bed 16, since the entire steering apparatus is mounted beneath the inclined gooseneck portions and beneath the bed 16, except that part of the rear steering column and the steering wheel 64 which necessarily projects above the level of the rear end 24 of the frame.

The above mentioned adapter drive shaft 14 will vary according to the nature of the power unit to be transported, and this member 14 will, of course, be rotated under power of the said power unit. The universal joint 68 is used to join this member 14 with the drive shaft 70 adjustably and rotatively mounted in a U-shaped bracket bearing member 72 carried by an integral slotted attachment plate 69 which is adjustably mounted by means of bolts 71 to the rear gooseneck 20. This drive shaft 70 is terminally provided with an interchangeable sprocket wheel 74 which is aligned with another sprocket wheel 76 on the forward end of the shaft 78 incorporated with the clutch mechanism generally indicated at 80. Since the gooseneck 20 is inclined, a set of sleeve spacers 73 of different lengths and a thrust collar 75 are provided to facilitate alignment of the sprocket wheel 74 with the sprocket wheel 76, this construction also allowing variation in driving speeds. Sprocket chains of different lengths are used to connect the sprocket wheels 74 and 76 and the gooseneck 20 is suitably apertured to allow the proper operation of this sprocket chain. A clutch pedal 84 is associated with the clutch 80 in conventional manner to allow the operation of the clutch by an operator seated on the seat 86 provided on the rear end 24 of the frame.

The transmission, including the gear change mechanism, is represented at 86. This transmission and gear change mechanism is operatively connected with the clutch mechanism 80 and a gear shift lever 88 extends upwardly above the level of the rear end 24 of the frame to a position allowing the operator to conveniently control the gear ratio of the drive. A drive shaft 90 extends from the transmission to a differential drive mechanism, the position of which is indicated at 92 in Figure 4, and the differential mechanism is, of course, connected to the axles on which the wheels 94 are mounted. It is preferred that the wheels be equipped with rubber tires 96 in order that the transport may be operated more efficiently and at higher rates of speed, as when the device is used in highway travel.

A brake drum 98 is provided on each of the wheels 94 and a complement of braking mechanism, including bellcranks 100, a transversely disposed tie rod 102, a forwardly extending link 104, and a brake pedal 106 is provided to allow the operator to better control the speed of travel of the transport. It will be understood that auxiliary frame members, including a vertical brace 108 and horizontal members 110, together with a substantially standard complement of axle housings 112, will be used to support the clutch, transmission and axles 114 on the frame. The structure mentioned immediately above may be of any suitable character and the detailed construction thereof is not material in this application, except in relation to the positioning and general arrangement of the elements concerned.

The operation of this invention will be clearly understood from the foregoing description of the mechanical details thereof, taken in connection with the above description of the objects sought to be achieved by this invention, and a more detailed discussion is deemed unnecessary.

Though there has been shown a particular embodiment of this invention, this invention is not limited to the preferred form described and illustrated in the drawings, and it is desired to limit this invention only in accord with the scope and limits defined by a proper interpretation of the appended claims.

Having described the invention, what is claimed as new is:

1. A transport for power units such as engines and tractors having a power take-off, comprising a frame with ground contacting steering wheels and traction wheels, a low-swung bed in said frame with goosenecks adjacent each end, the rear end of the frame carrying a power transmission mechanism and said traction wheels, said power transmission mechanism including a differential and gear change assembly located beneath the rear gooseneck, controls for said mechanism on the top of said rear gooseneck, a shaft extending from the gear change assembly and carrying a sprocket wheel, another shaft mounted on the rear gooseneck and operatively connected to said sprocket wheel, said last-mentioned shaft having a universal joint and being connectible to said power take-off, whereby the tractor may be positioned on said low-swung bed with the rear of the tractor toward said rear gooseneck.

2. A transport according to claim 1 and in which said power transmission mechanism includes a clutch, and said traction wheels have brakes, a steering wheel operatively connected with said steering wheels, said steering wheel and controls for said clutch and brakes being located on top of said rear gooseneck, whereby the motion of the transport can be controlled without changing the throttle adjustment of an engine or tractor carried on said transport.

MELVIN BERL STALLARD.

REFERENCES CITED

The following references are of record in the file of this patent:

UNITED STATES PATENTS

| Number | Name | Date |
| --- | --- | --- |
| 464,246 | Dewey | Dec. 1, 1891 |
| 885,822 | Wright | Apr. 28, 1908 |
| 988,121 | Marquette | Mar. 28, 1911 |
| 1,419,689 | Porter | June 13, 1922 |
| 1,538,694 | Gledhill | May 19, 1925 |
| 2,121,245 | Francis | June 21, 1938 |
| 2,152,273 | Otto | Mar. 28, 1939 |
| 2,168,108 | Bunau-Varilla | Aug. 1, 1939 |
| 2,250,070 | Simmons | July 22, 1941 |